United States Patent
Wallace et al.

(10) Patent No.: US 12,499,589 B2
(45) Date of Patent: Dec. 16, 2025

(54) SYSTEMS AND METHODS FOR IMAGE GENERATION VIA DIFFUSION

(71) Applicant: Salesforce, Inc., San Francisco, CA (US)

(72) Inventors: Bram Wallace, Auburn, WA (US); Nikhil Naik, Mountain View, CA (US)

(73) Assignee: Salesforce, Inc., San Francisco, CA (US)

( * ) Notice: Subject to any disclaimer, the term of this patent is extended or adjusted under 35 U.S.C. 154(b) by 280 days.

(21) Appl. No.: 18/333,695

(22) Filed: Jun. 13, 2023

(65) Prior Publication Data

US 2024/0303873 A1  Sep. 12, 2024

Related U.S. Application Data

(60) Provisional application No. 63/489,097, filed on Mar. 8, 2023.

(51) Int. Cl.
  G06T 11/00 (2006.01)
  G06T 5/60 (2024.01)
  G06T 5/70 (2024.01)

(52) U.S. Cl.
  CPC .............. G06T 11/00 (2013.01); G06T 5/70 (2024.01); *G06T 2207/20084* (2013.01)

(58) Field of Classification Search
  CPC . G06T 11/00; G06T 5/70; G06T 2207/20084; G06T 5/60
  See application file for complete search history.

(56) References Cited

U.S. PATENT DOCUMENTS

| | | | |
|---|---|---|---|
| 2024/0135610 A1* | 4/2024 | Kolkin | G06T 5/70 |
| 2024/0185035 A1* | 6/2024 | Yu | G06N 3/0455 |
| 2025/0086843 A1* | 3/2025 | Zafar | G06N 3/0464 |

OTHER PUBLICATIONS

Song, Y., Sohl-Dickstein, J., Kingma, D. P., Kumar, A., Ermon, S., and Poole, B. Score-based generative modeling through stochastic differential equations. arXiv preprint arXiv:2011.13456, 2020b.
Dhariwal, P. and Nichol, A. Diffusion models beat gans on image synthesis. Advances in Neural Information Processing Systems, 34:8780-8794, 2021.
Li, W., Xu, X., Xiao, X., Liu, J., Yang, H., Li, G., Wang, Z., Feng, Z., She, Q., Lyu, Y., et al. Upainting: Unified text-to-image diffusion generation with cross-modal guidance. arXiv preprint arXiv:2210.16031, 2022.

* cited by examiner

*Primary Examiner* — James A Thompson
*Assistant Examiner* — Jenny N Tran
(74) *Attorney, Agent, or Firm* — Haynes and Boone, LLP

(57) ABSTRACT

Embodiments described herein provide a method of generating an image. the method comprises receiving, via a data interface, a natural language prompt, obtaining a noised image vector, and generating a denoised image vector by a first forward pass of a plurality of iterations of a denoising diffusion model with the noised image vector as an input and conditioned on the natural language prompt. The method further includes calculating a gradient of a loss function based on the denoised image vector with respect to the noised image vector, and updating the noised image vector based on the gradient. A final image is generated using a final forward pass of the denoising diffusion model with the updated noised image vector as an input and conditioned on the natural language prompt.

20 Claims, 8 Drawing Sheets

SYSTEMS AND METHODS FOR IMAGE GENERATION VIA DIFFUSION

CROSS REFERENCE(S)

The instant application is related to commonly-owned U.S. provisional application No. 63/489,097, filed Mar. 8, 2023, which is hereby expressly incorporated herein by reference in its entirety.

TECHNICAL FIELD

The embodiments relate generally to machine learning systems for image generation, and more specifically to latent optimization for image generation via diffusion.

BACKGROUND

Machine learning systems have been widely used in image generation tasks. For example, conditioned denoising diffusion models (DDMs) are used for generating realistic images given an input text prompt. A random noise vector is iteratively denoised by running the vector through the DDM conditioned by the text prompt. An additional conditioning method which may be used together with text conditioning is "latent optimization".

Latent optimization works by optimizing the original random vector (latent) through a process similar to backpropagation. The parameters of the model itself are not being updated, but the input vector. Latent optimization may be performed based on a gradient associated with a generated image. Existing methods for computing the gradients either store in memory all of the intermediate latents (activations) during a forward pass of an image generation process so that they may be used in the backward pass gradient calculations, or they recompute the intermediate latents repeatedly at each backwards step. The problem with these methods is that they are impractical for either requiring too much memory, or too much computation time.

Therefore, there is a need for an improved image generation framework capable of latent optimization.

Figure 1:
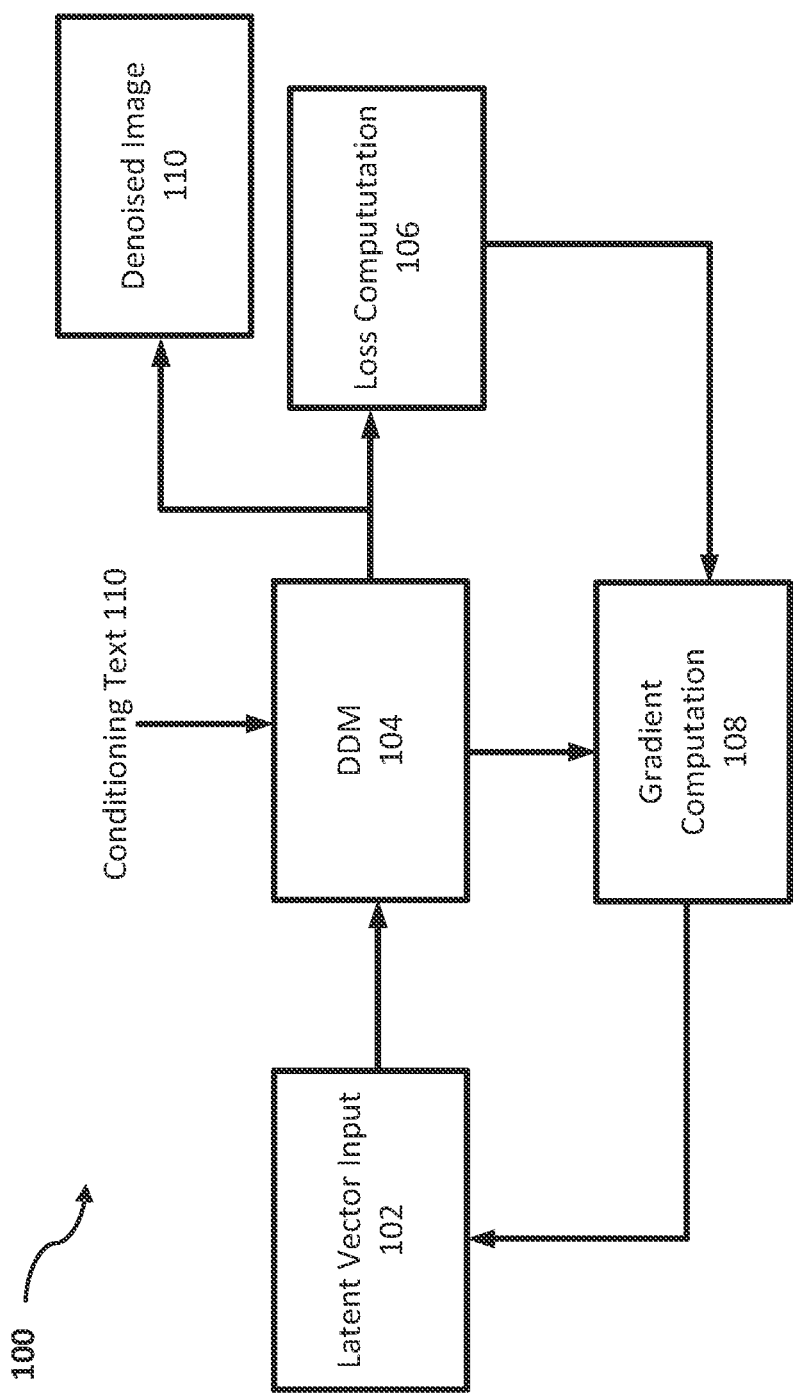
FIG. 1 is a simplified diagram illustrating an image generation framework according to some embodiments.

Embodiments of the disclosure and their advantages are best understood by referring to the detailed description that follows. It should be appreciated that like reference numerals are used to identify like elements illustrated in one or more of the figures, wherein showings therein are for purposes of illustrating embodiments of the disclosure and not for purposes of limiting the same.

DETAILED DESCRIPTION

As used herein, the term "network" may comprise any hardware or software-based framework that includes any artificial intelligence network or system, neural network or system and/or any training or learning models implemented thereon or therewith.

As used herein, the term "module" may comprise hardware or software-based framework that performs one or more functions. In some embodiments, the module may be implemented on one or more neural networks.

Text-conditioned denoising diffusion models (DDMs) are used for generating realistic images given an input text prompt. A random noise vector is iteratively denoised by running the vector through the DDM a number of times (e.g., 50 times) conditioned by the text prompt. There exist additional methods which may be used to further condition the image generation beyond the conditioning prompt. These additional conditioning methods are forms of "latent optimization".

Latent optimization works by optimizing the original random vector (latent) through a process similar to backpropagation. To be clear, the parameters of the model itself are not being updated, but rather the input vector. A forward pass is used to generate an initial image from a random vector, and then a loss is computed based on that final image. The loss function may generally be any differentiable loss function. In one example, the loss is computed by a second pre-trained model which gives an aesthetic score to the generated image. By computing the gradients in a backward pass, the initial random vector may be optimized.

Traditionally, the gradients may be computed based on intermediate latents on the backward pass. For one example, all of the intermediate latents (activations) may be stored in a memory during the forward pass so that they may be used in the backward pass gradient calculations. For another example, the intermediate latents may be repeatedly recomputed at each backwards iteration step by re-performing the forward pass up to the current iteration. The problem with these methods is that storing all the intermediate latents in memory is not feasible as it would require hundreds of gigabytes, and recomputing the intermediate latents repeatedly is too computationally intensive to be feasible.

In view of the need for efficient image generation by conditioning DDMs, embodiments described herein provide a method for text-conditioned image generation via direct optimization of diffusion latents (DOODL). DOODL allows for optimization of the initial diffusion noise vectors with respect to a loss computed with respect to the generated image. DOODL leverages invertible diffusion processes, which admit backpropagation with constant memory cost with respect to the number of diffusion steps, and computes gradients on the pixels of the final generation with respect to the original noise vectors. This enables efficient iterative optimization of diffusion latents with respect to any differentiable loss on the image pixels and accurate calculation of gradients for classifier guidance. For example, an example reversible diffusion process is exact diffusion inversion via a coupled transformations (EDICT) as described in co-pending and commonly-owned U.S. nonprovisional application Ser. No. 18/175,156, filed Feb. 27, 2023, which is hereby expressly incorporated herein by reference in its entirety.

Embodiments described herein overcome the memory/computation limitations of the naive methods of latent optimization for image generation via diffusion. By leveraging a reversible diffusion process, one does not need to store in memory all the intermediate latents, nor do they need to recompute them during the backward pass. Instead, each prior intermediate activation function may be computed as the one-step reversal of the current DDM step. In other words, when computing the gradient of DDM iteration N, instead of recomputing all of the latent activations from 1 through N-1, . . . , N-1 may be computed directly via a single step based on iteration N itself.

Embodiments described herein provide a number of benefits. For example, generated images are improved based on metrics which account for compositionality and the ability to guide using unusual captions. Further, the vocabulary of a diffusion model may be effectively grown by leveraging the vocabulary of a classifier. Additional modalities may be used beyond text, such as a reference image against which a generated image is compared to generate a loss. The methods described herein may be performed without any retraining of any new network. Finally, the methods require far less memory and far less computational resources than alternative methods.

Overview

Figure 2A:
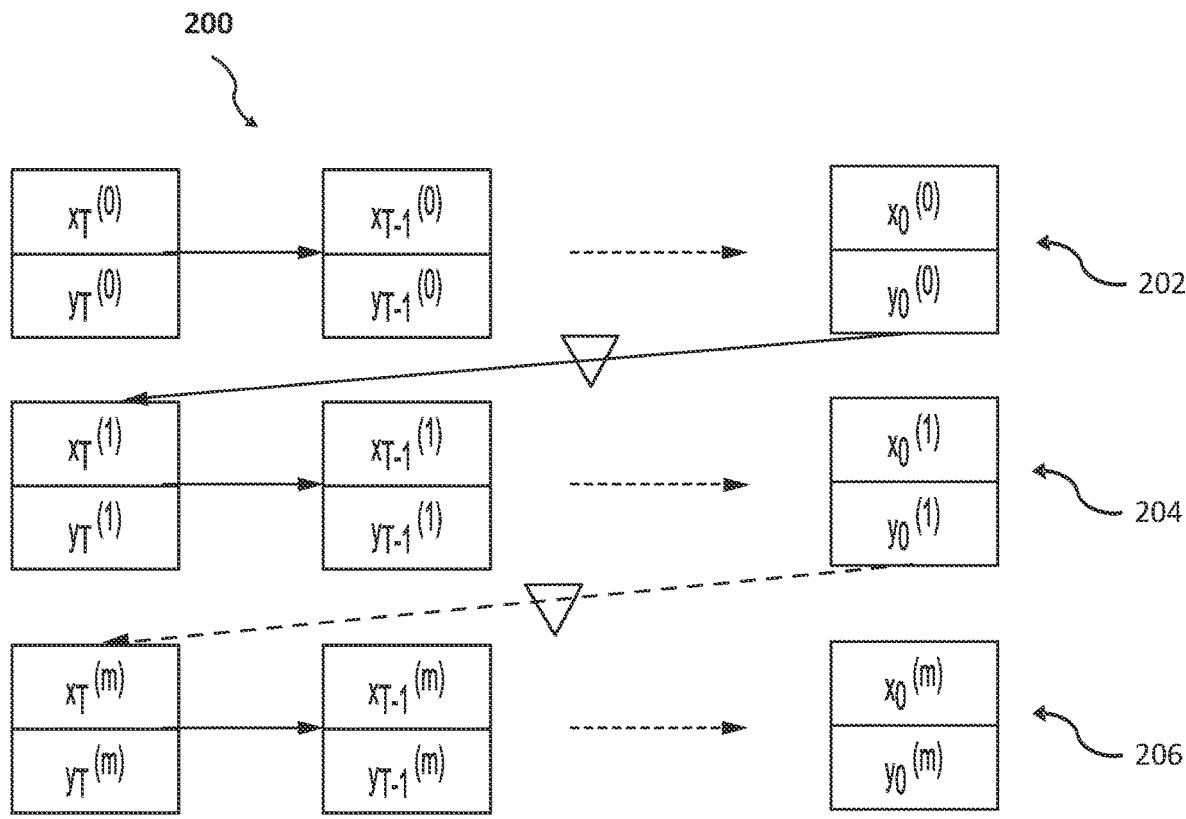
FIG. 2A is a simplified diagram illustrating an image generation framework according to some embodiments.

FIG. 1 is a simplified diagram illustrating an image generation framework 100 according to some embodiments. The framework 100 comprises a latent vector input 102, which is an input to denoising diffusion model (DDM) 104. DDM 104 is iteratively used to denoise latent vector input 102 conditioned by conditioning text 110. Specifically, latent vector input 102 is input to DDM 104, which outputs an updated vector which is slightly denoised. That updated vector is then fed back into DDM 104 as an input for another iterative denoising step. This process may continue a number of times (e.g., 50 times), e.g., to repeatedly and iteratively feeding updated vector from the DDM 104 back to the DDM 104, to produce a suitably denoised output. Each forward passing-through of the DDM 104 is referred to herein as an iterative step. A full set of iterative steps which denoises a latent vector input 102 to a fully denoised output is referred to herein as a forward pass. The vectors which are output from DDM 104 and subsequently input to DDM 104 at each iterative step are referred to as intermediate vectors or intermediate activations. As described more fully herein with respect to FIG. 2A, the processes described herein may include multiple forward passes, each comprising a number of iterative steps of DDM 104. FIG. 2A illustrates the individual iterations of each forward pass.

While the DDM 104 is described as working with vectors, it should be understood that the vectors are generally representations of an image, and an image may be decoded from the vector at any step. In some embodiments, DDM 104 may directly use image data rather than a latent vector representation. In some embodiments, instead of outputting a vector representation of an image, DDM 104 outputs an update vector which defines how the input vector should be updated in order to denoise. In this case, a resultant vector is generated by summing the input vector to the update vector, and the resultant vector is used as the input to the DDM 104 for the next iterative step (or as the representation of the final image).

Loss computation 106 computes a loss based on the denoised image output of DDM 104 after a full forward pass of all iterative steps. Examples of loss functions are discussed in more detail below. Gradient computation 108 computes a gradient of the loss computation with respect to the latent vector input 102. To do so, gradient computation 108 uses the intermediate vectors (activations), DDM 104 iteration functions, and loss computation 106 to compute the gradient as discussed in more detail with respect to FIGS. 2A-2B. Gradient computation 108 updates latent vector input 102 in a step proportional to the computed gradient.

The process may repeat iteratively with multiple full forward passes, where after each forward pass the latent vector input 102 progressively updates based on the computed gradient, and another forward pass is performed with the updated vector as the input, such that each forward pass and update to the input vector further minimizes the loss computed at loss computation 106. Once latent vector input 102 has been sufficiently optimized, a final forward pass may be performed to generate a final image, optimized for the particular loss at loss computation 106.

FIG. 2A is a simplified diagram 200 illustrating an image generation framework according to some embodiments. Each row 202, 204, 206 of diagram 200 represents a forward pass of iteratively denoising an input to generate a denoised output image. For each element of diagram 200, the x and y pair are vector representations at that specific iteration of DDM 104. The reason for there being a pair of representations at each iteration is to allow for the process to be reversed, for example via the EDICT process. The value in the subscript of each x and y represents the iterative step, where 0 is the final iterative step in a forward pass, and T is the total number of iterative steps configured. The superscript for each x and y represents the index of the forward pass, the first forward pass denoted as 0, and there being m total forward passes configured for the whole process. For example, forward pass 202 may take a randomly initialized latent vector input 102 as an input to DDM 104, and iteratively denoise the latent vector through the illustrated iterations of DDM 104 (e.g., $x_T$ and $y_T$, $x_{T-1}$ and $y_{T-1}$, . . . ).

At the end of forward pass 202, a gradient may be calculated for a particular loss function (described in more detail with respect to FIG. 2B) with respect to the input vector, as illustrated by the gradient symbol on the arrow pointing to the next row. The input vector may be updated based on the computed gradient, and used as an input to forward pass 204. Forward pass 204 repeats the process as done in forward pass 202, but with the initial vector input being the updated input, effectively performing a gradient descent optimization of the input latent vector. Similarly, at the end of forward pass 204, the input vector is again updated based on a gradient calculation and used as the input for forward pass 206.

This process is repeated iteratively until a final image is generated. The number of iterative steps T for each forward pass may be, for example, 50 steps. The number of forward passes m may be, for example, 100. The computation of the gradient associated with each forward pass, as discussed in more detail below, requires each intermediate latent (activation). Storing each intermediate activation in memory is not practical, and recomputing each intermediate activation per re-computing a partial forward pass up to each step during a backward pass is also not practical. In order to efficiently compute gradients, an invertible diffusion process (e.g., EDICT) is leveraged. This allows for the gradient calculations to not require the re-computation of intermediate activations, or the storing of all the intermediate activations in memory. The details of the invertible diffusion process and gradient calculations follows.

When using gradient descent for optimizing neural networks, with network parameters $\xi$, network input x, network output $z=f(x)$, and loss function c, the derivative $dc(z)/d\xi$ is calculated and gradient descent is performed to minimize $$\mathbb{E}_{Data} c(z) = \mathbb{E}_{Data} c(f(x)).$$

Here f is implicitly conditioned on $\xi$, which is one of the parameters of the neural network.

When f is a deep neural network, it can be represented by the composition of n functions (layers) $f^n \circ f^{n-1} \circ \ldots \circ f^1$. Assuming that $\xi$ belongs to the $i^{th}$ layer $f^i$ and that $f^{n-1} \circ \ldots \circ f^1(x)=y$ then to optimize $\xi$ the derivative $dc(z)/d\xi$ must be calculated. For simplicity, denote $f^k \circ f^{k-1} \circ \ldots \circ f^j = F_j^k$. Since $z=f^n(f^{n-1}(\ldots f^i(y)\ldots))=F_i^n(y)$ the derivative with respect to $\xi$ can be calculated using the chain rule as follows:

$$\frac{dc(z)}{d\xi} = \frac{dc(F_i^n(y))}{d\xi} \quad (1)$$

$$= \frac{dc(F_i^n(y))}{dF_i^n(y)} \cdot \frac{dF_i^n(y)}{dF_i^{n-1}(y)} \cdots \frac{dF_i^{i+1}(y)}{dF_i^i dy} \cdot \frac{df^i}{dy} \quad (2)$$

In the general case, to calculate the derivative of the loss with respect to any intermediate parameter, all of the intermediate outputs must be known as well. This is a key bottleneck to optimization via gradient descent/backpropagation; all intermediate activations must be stored in order to compute the gradient. Specifically, each of the ratios in equation (2) which are multiplied together relies on computing the derivative of the DDM function at each iteration step with respect to the input activation (latent) at that iteration. After denoising a noised image vector through a forward pass of a number of iterations of the DDM and a loss (i.e., cost) function, computing the gradients on a backward pass under existing methods would require either remembering all of the intermediate activations (latents), or recomputing them. However, the re-computing of any particular intermediate activation requires re-computing each DDM iteration up to that step, as each step depends on the previous step. Below, a reversible DDM process is discussed which instead allows for recomputing an input activation to a DDM iteration through the invertible DDM process based on the output of that DDM iteration. In this way, each activation may be efficiently reconstructed on the backward pass as-needed without recomputing all prior activations.

Invertible neural networks, where intermediate states y and inputs x are fully recoverable from output z can circumvent these memory constraints by reconstructing intermediate inputs as they are required, avoiding having to cache activations during the forward pass. If every $f^j$ were invertible then the values in the denominators of Equation (1) could be reconstructed during the backwards pass and then disposed of.

DDMs for image generation are trained to predict the noise $\epsilon$ added to an image x. Noise levels are discretized into a set $T=\{0, 1 \ldots, T\}$ that index a noising schedule $\{\alpha_t\}_{t=0}^T$, $\alpha_T=0$, $\alpha_0=1 \cdot t \in T$ are randomly sampled during training and paired with data $x^{(i)}$ to generate noisy samples:

$$x_t^{(i)} = \sqrt{\alpha_t} x^{(i)} + \sqrt{1-\alpha_t} \epsilon \quad (3)$$

where $\epsilon$ is a draw from a standard normal distribution. For image generation, $x^{(i)}$ can be the images themselves or autoencoded representations. DDMs conditioned on the timestep t and auxiliary information (typically an image caption) C are trained to approximate the added noise DDM $(x_t^{(i)}, t, C) \approx \epsilon$.

At generation time, an $x_T \sim N(0, 1)$ is drawn that represents an arbitrary fully noised image. Observe that in Equation (3) when $t=T$ that $\alpha_t=\alpha_T=0$. The denoising model is then applied iteratively to incrementally hallucinate a real image from the noise. Accounting for the conditioning signal (t, C) for a DDM parameterized by function $\Theta$ following a sampling schedule of S steps, the final generation $x_0$ is equal to a composition of S denoising functions that are repeated applications of $\Theta$ conditioned on varying timesteps t. Denoting $\Theta(x, t, C)$ as $\Theta_{t,C}(x)$ $$x_0 = [\Theta_{(0,C)} \circ \Theta_{(1,C)} \circ \ldots \circ \Theta_{(T,C)}](x_T) \quad (4)$$

In addition to the learned conditioning C in Equation (4), other guidance signals can be used during sampling to steer generations to suit desired criteria. One example of this is "classifier guidance", where the gradients of the loss (denoted $C_{clf}$) of classifier network $\Phi$ with respect to generated pixels is incorporated into the noise prediction. From a theoretical perspective, in the typical case this is the gradient of the log-conditional probability given by $\nabla \log p_\Phi(y|x_t)$.

As shown in Equation (4), it is mathematically trivial to optimize $x_T$ for a desired outcome on $x_0$. According to the chain rule as in Equation (1), there is a closed form expression for $dx_0/x_T$. However, this is a computationally expensive process. To perform such an optimization requires T applications of the diffusion model $\Theta$ which are then backpropagated through, so memory costs scale linearly in the number of DDM sampling steps $S=T$.

As a practical example, with $S=50$, a typical value, the memory cost of a naive implementation would be in hundred of Gigabytes for a state-of-the-art diffusion model such as Stable Diffusion, which is impractical for most users. If we maintain the memory cost with gradient checkpointing, it would increase the computational complexity of each backwards pass by a factor of S, making the calculation overall quadratic in S (from S DDM steps and s steps to checkpoint the gradient for $dx_0/x_s$).

To perform this optimization of $x_T$ with respect to criteria on $x_0$ while maintaining a feasible runtime, an invertible function can be used to reconstruct inputs during the backwards pass using only a constant number of applications of $\Theta$ with respect to s, meaning that the runtime of the backwards pass scales linearly in S as the forward pass does.

One invertible variant of the discrete (time-stepped) diffusion process, is called EDICT (Exact Diffusion Inversion via Coupled Transforms) as described in Wallace et al., Edict: Exact diffusion inversion via coupled transformations, arXiv:2211.12446, 2022. In EDICT, the reverse (denoising) diffusion process is defined by $$x_t^{inter} = a_t \cdot x_t + b_t \cdot \Theta_{t,C}(y_t) \quad (5)$$

$$y_t^{inter} = a_t \cdot y_t + b_t \cdot \Theta_{t,C}(x_t^{inter})$$

$$x_{t-1} = p \cdot x_t^{inter} + (1-p) \cdot y_t^{inter}$$

$$x_{t+1} = (x_{t+1}^{inter} - b_{t+1} \cdot \Theta_{t+1,C}(y_{t+1}))/a_{t+1}$$

The inversion (deterministic noising) is defined by $$y_{t+1}^{inter} = (y_t - (1-p) \cdot x_t)/p \quad (6)$$

$$x_{t+1}^{inter} = (x_t - (1-p) \cdot y_{t+1}^{inter})/p$$

$$y_{t+1} = (y_{t+1}^{inter} - b_{t+1} \cdot \Theta_{t+1,C}(x_{t+1}^{inter}))/a_{t+1}$$

$$x_{t+1} = (x_{t+1}^{inter} - b_{t+1} \cdot \Theta_{t+1,C}(y_{t+1}))/a_{t+1}$$

EDICT can admit a constant-memory implementation of optimization of $x_t$. Given conditioning C, classification or other differentiable model-based cost function c and a latent draw $x_T$, the EDICT generative process is performed to get an initial output $(x_0^{(0)})$, as shown in row 202 of diagram 200, which is then used to calculate a loss $c(x_0^{(0)})$ and corresponding gradient $\nabla_{x_t} c(x_0^{(0)})$. This gradient can then be used to perform a step of gradient descent optimization on $x_T$ as shown by the line with the gradient symbol $\nabla$ showing feedback from row 202 to row 204. This process may be repeated, as shown with feedback between row 204 and row 206. Dashed lines are illustrated to represent where multiple iterations are not shown. For example, each row may contain about 50 reversible denoising steps, and there may be about 50 rows, each representing a gradient feedback step.

As discussed above, although the computation of the gradient of the loss with respect to the input vector requires the intermediate activations of each DDM iteration, such intermediate activations may be reconstructed via the reversible EDICT process or any other reversible diffusion process. For example, to reconstruct the activation (intermediate latent vector) at DDM iteration 1 (where the forward iterations are numbered T to 0), rather than re-computing the denoising steps from T to 1, the output of iteration 1 may be used to directly reconstruct the input to 1. In this way, the activations do not need to be stored in memory during the forward pass, nor do excessive recomputations need to be performed.

The gradient may be computed with respect to any differentiable loss function that may be applied to a generated image. Depending on the loss function/model utilized, guidance of the DDM process may be used to arrive at different results, as described below.

Figure 2B:
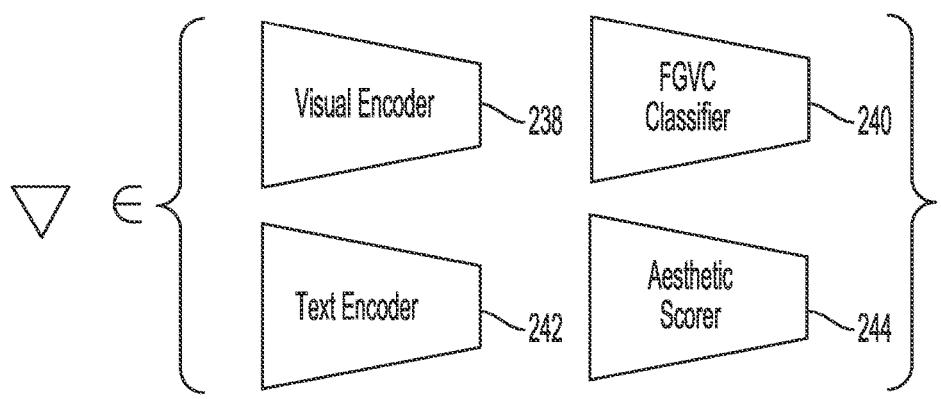
FIG. 2B is a diagram conceptually illustrating a gradient of the loss to update the image generation framework shown in FIG. 2A, according to some embodiments.

FIG. 2B is a diagram conceptually illustrating a gradient of the loss to update the image generation framework shown in FIG. 2A, according to some embodiments. FIG. 2B shows that the gradient for training the image generation framework built on one of more modules of visual encoder 238, fine-grained visual classification (FGVC) classifier 240, text encoder 242 and aesthetic scorer 244.

In a first example, text guidance based on the conditioning text (e.g., conditioning text 110 in FIG. 1) may be reinforced by the latent optimization process using text encoder 242 such as a CLIP text-image encoder as described in Nichol et al., Glide: Towards photorealistic image generation and editing with text-guided diffusion models, arXiv: 2112.10741, 2021. Specifically, classifier guidance using a CLIP text-image similarity loss may reinforce the text conditioning C provided as input to a text-to-image diffusion model. a simple spherical distance loss between the embedding of C by the text encoder $CLIP_{Texte}(C)$ and the embedding of $(x_0^{(i)})$ by the image encoder $CLIP_{Image}(x_0^{(i)})$ may be used. The spherical distance metric is:

$$d(x, y) = 2\sqrt{\sin^{-1}\left(\frac{\|x-y\|}{2}\right)} \quad (7)$$

In a second example, a fine-grained visual classification (FGVC) classifier 240 may be used to guide image generation. For example, the Caltech-UCSD Birds classifier as described in Wah et al., The caltech-ucsd birds-200-2011 dataset, 2011. The birds classifier, similar to other fine-grained visual classification models, includes many classes of objects on which it is trained. For example, rather than training on generic images of birds, or well-known species, the birds classifier may be trained on images to classify very specific birds such as a blue-winged warbler. Current text-to-image diffusion models have likely not been trained with image-text pairs containing these fine-grained classes. A pretrained diffusion model such as Stable Diffusion ends us generating images that while fitting the criteria at a very broad level (e.g., "a bird") do not contain the fine-grained features that define the particular class (e.g., "a Least Flycatcher"). By performing latent optimization with a fine-grained visual classifier, the vocabulary of a pretrained diffusion model is effectively expanded, and specific categories of images may be successfully generated. For classifier guidance, binary cross-entropy (BCE) loss may be computed from supervised models trained on FGVC datasets. Given a model m trained on a dataset with classes $$\{class_i\}_{i=1}^{n_c}$$

the diffusion model may be guided to generate instances of class j by employing the loss $$c(x_0^{(i)}) = BCE(m(x_0^{(i)}), j).$$

In a third example, a visual encoder 238 may be used for computing gradients and optimizing latents. This may be used to achieve visual personalization, making a diffusion model generate images that contain a highly specific entity or concept, using an image/images containing this entity as concept as an exemplar. Existing methods of visual personalization require fine-tuning or re-training models. The training and/or finetuning cost and necessitated model storage for re-use are their drawbacks. Using the methods described herein with visual encoder 238 enables visual personalization using classifier guidance. An example of a visual encoder which may be used is a CLIP visual encoder as described in. A cost function c may be employed that is the same spherical distance as in Equation (7) but taken between the image embedding of the conditioning image $CLIP_{Image}$ ($C_{Image}$) and that of the current generation $CLIP_{Image}(x_0^{(i)})$.

In a fourth example, aesthetic scorer 244 may be used. An aesthetic scorer may be a neural network model which is trained in a supervised fashion with images paired with subjective aesthetic scores labelled by humans. In some embodiments, the aesthetic scorer is a linear head trained on top of an existing visual embedding model. The cost function based on a scoring function a may be computed by $$c(x_0^{(i)}) = -1 \cdot a(x_0^{(i)}).$$

In some embodiments, rather than begin the process with a random input vector, the input vector may be a noised version of an existing image. For example, an image of a dog in a field may be provided. Using an invertible diffusion process (e.g., EDICT), a noised image vector may be computed by iteratively noising the image. Then, using the process described above, the noised image may be optimized for a specified loss function, before regenerating a final image. The result will be a modification of the original image, optimized for the particular loss function. For example, if the loss function is an aesthetic scorer 244, then the original image may be modified to be more aesthetically pleasing based on the aesthetic scorer 244. The latent optimization process and final image generation may be done using a conditioning text (e.g., conditioning text 110 in FIG. 1). In some embodiments, when editing an image using this method, conditioning text may be omitted, so that the only guidance comes from the original image and whatever loss function is being used for guidance. This may remove the requirement of describing the image when all that is desired is, for example, to improve the aesthetics of an image using an aesthetic scorer 244.

After each optimization step, the EDICT latents $x_T^{(j)}$ and $y_T^{(j)}$ are averaged together and renormalized to the original norm of $x_T^{(0)}$. The averaging prevents latent drift which degrades quality. Normalizing to the original norm keeps the latent on the "gaussian shell" and in-distribution for the diffusion model.

Multi-crop data augmentation may also be performed on the generated ($x_0$, $y_0$), sampling 16 crops per image. Stochastic gradient descent momentum may also be employed to help avoid local minima. Finally, to increase stability and realism of outputted images, element-wise clipping of g may be performed at magnitude $10^{-3}$ and at each update, $x_T$ by N (0, $10^{-4} \cdot I$) may be perturbed.

Another method by which classifier guidance may be used when there is insufficient memory and/or computation resources to perform a full gradient calculation across all DDM iterations, is to perform a single-step DDM denoising approximation. However, this yields poor results as the one-step denoising approximation differs greatly from the full denoised image.

Computer and Network Environment

Figure 3A:
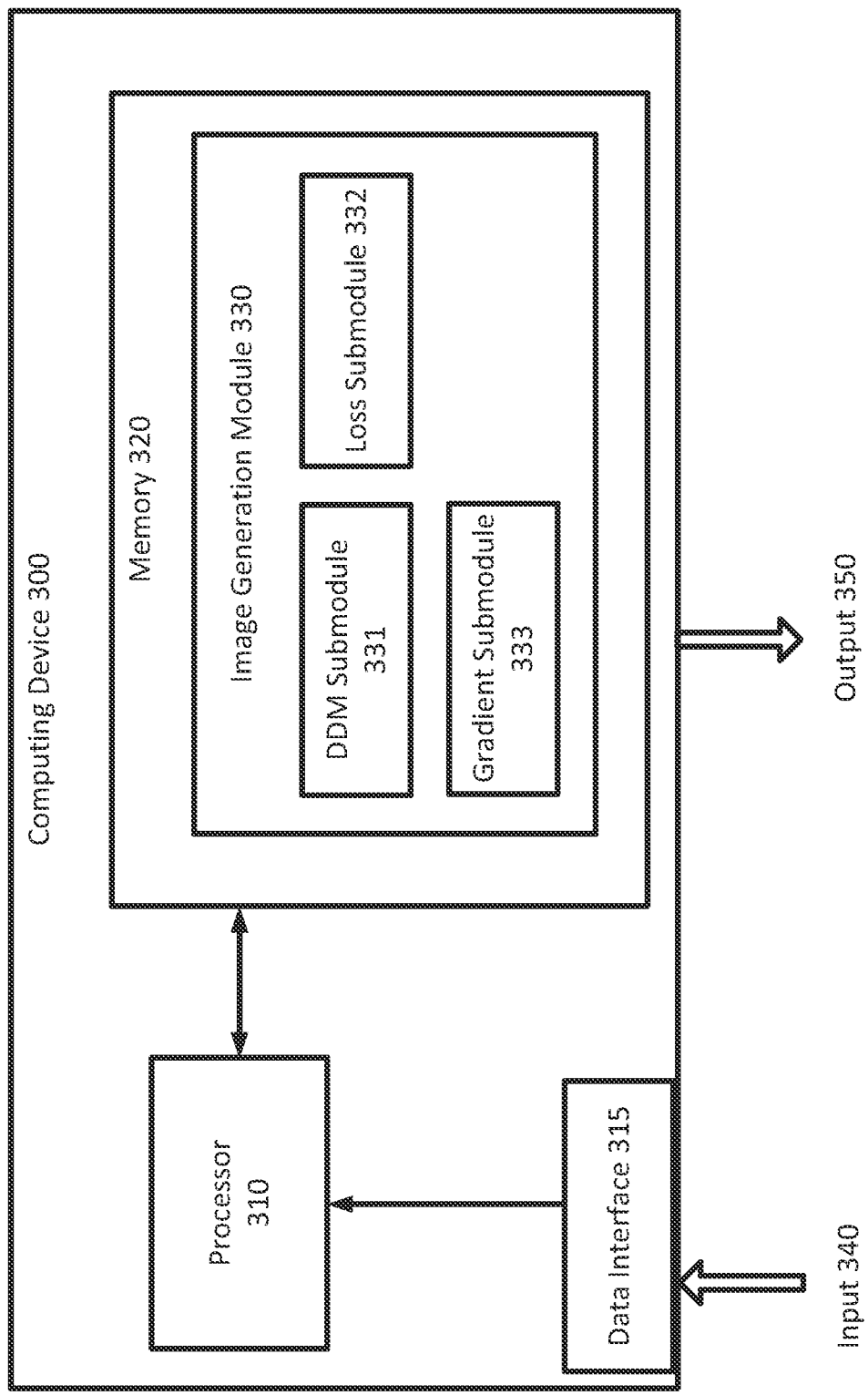
FIG. 3A is a simplified diagram illustrating a computing device implementing the image generation framework described in FIGS. 1-2, according to some embodiments.

FIG. 3A is a simplified diagram illustrating a computing device implementing the image generation framework described herein. As shown in FIG. 3A, computing device 300 includes a processor 310 coupled to memory 320. Operation of computing device 300 is controlled by processor 310. And although computing device 300 is shown with only one processor 310, it is understood that processor 310 may be representative of one or more central processing units, multi-core processors, microprocessors, microcontrollers, digital signal processors, field programmable gate arrays (FPGAs), application specific integrated circuits (ASICs), graphics processing units (GPUs) and/or the like in computing device 300. Computing device 300 may be implemented as a stand-alone subsystem, as a board added to a computing device, and/or as a virtual machine.

Memory 320 may be used to store software executed by computing device 300 and/or one or more data structures used during operation of computing device 300. Memory 320 may include one or more types of machine-readable media. Some common forms of machine-readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 310 and/or memory 320 may be arranged in any suitable physical arrangement. In some embodiments, processor 310 and/or memory 320 may be implemented on a same board, in a same package (e.g., system-in-package), on a same chip (e.g., system-on-chip), and/or the like. In some embodiments, processor 310 and/or memory 320 may include distributed, virtualized, and/or containerized computing resources. Consistent with such embodiments, processor 310 and/or memory 320 may be located in one or more data centers and/or cloud computing facilities.

In some examples, memory 320 may include non-transitory, tangible, machine readable media that includes executable code that when run by one or more processors (e.g., processor 310) may cause the one or more processors to perform the methods described in further detail herein. For example, as shown, memory 320 includes instructions for image generation module 330 that may be used to implement and/or emulate the systems and models, and/or to implement any of the methods described further herein. image generation module 330 may receive input 340 such as an input images, text prompts, other conditioning information or loss criteria via the data interface 315 and generate an output 350 which may be a generated image.

The data interface 315 may comprise a communication interface, a user interface (such as a voice input interface, a graphical user interface, and/or the like). For example, the computing device 300 may receive the input 340 (such as a training dataset) from a networked database via a communication interface. Or the computing device 300 may receive the input 340, such as images and prompts, from a user via the user interface.

In some embodiments, the image generation module 330 is configured to generate an image as described herein. The image generation module 330 may further include a DDM submodule 331 (similar to DDM 104 in FIG. 1), loss submodule 332 (similar to loss computation 106 in FIG. 1), and Gradient Submodule 333 (similar to gradient computation 108 in FIG. 1). DDM Submodule 331 may be configured to iteratively denoise an image based on an input latent vector, conditioned by an input text. Loss Submodule 332 may be configured to compute a loss as described herein. For example, the loss may be computed based on a classifier score generated by a pre-trained classifier model using the generated image as an input. Gradient Submodule 333 may be configured to compute gradients as described herein. For example, gradients may be computed by iteratively computing gradients at each backward step by using a reversed DDM operation. The computed gradients may be used to update the input latent vector, and a final image may be generated by using the DDM with the updated latent vector as an input. In one embodiment, the image generation module 330 and its submodules 331-333 may be implemented by hardware, software and/or a combination thereof.

Some examples of computing devices, such as computing device 300 may include non-transitory, tangible, machine readable media that include executable code that when run by one or more processors (e.g., processor 310) may cause the one or more processors to perform the processes of method. Some common forms of machine-readable media that may include the processes of method are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 3B:
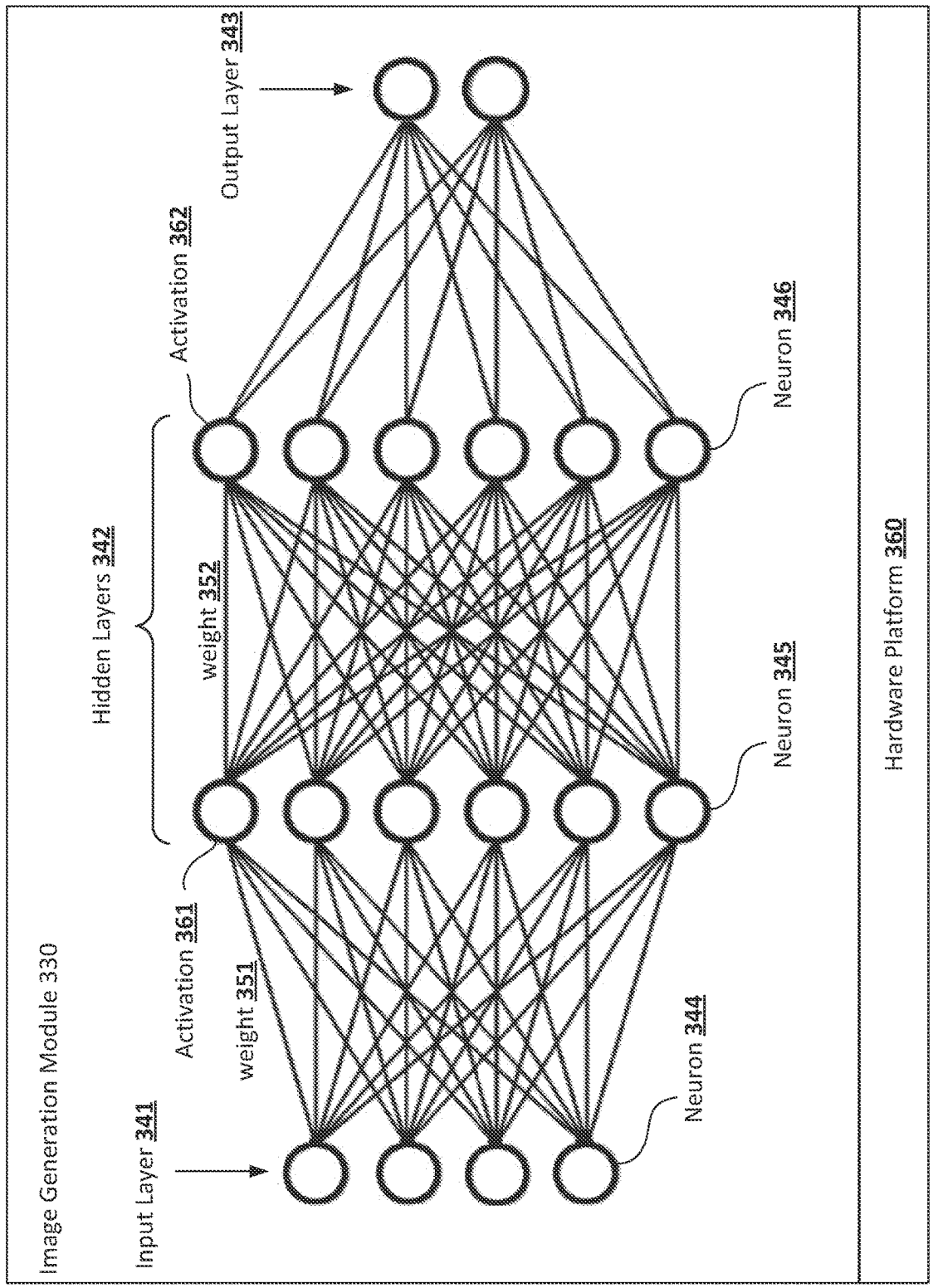
FIG. 3B is a simplified diagram illustrating the neural network structure implementing the image generation module 330 described in FIG. 3A, according to one embodiment described herein.

FIG. 3B is a simplified diagram illustrating the neural network structure implementing the image generation module 330 described in FIG. 3A, according to one embodiment described herein. In one embodiment, the image generation module 330 and/or one or more of its submodules 331-333 may be implemented via an artificial neural network structure shown in FIG. 3B. The neural network comprises a computing system that is built on a collection of connected units or nodes, referred to as neurons (e.g., 344, 345, 346). Neurons are often connected by edges, and an adjustable weight (e.g., 351, 352) is often associated with the edge. The neurons are often aggregated into layers such that different layers may perform different transformations on the respective input and output transformed input data onto the next layer.

For example, the neural network architecture may comprise an input layer 341, one or more hidden layers 342 and an output layer 343. Each layer may comprise a plurality of neurons, and neurons between layers are interconnected according to a specific topology of the neural network topology. The input layer 341 receives the input data (e.g., 340 in FIG. 3A), such as an input image. The number of nodes (neurons) in the input layer 341 may be determined by the dimensionality of the input data (e.g., the length of a latent vector input 102 in FIG. 1). Each node in the input layer represents a feature or attribute of the input.

The hidden layers 342 are intermediate layers between the input and output layers of a neural network. It is noted that two hidden layers 342 are shown in FIG. 3B for illustrative purpose only, and any number of hidden layers may be utilized in a neural network structure. Hidden layers 342 may extract and transform the input data through a series of weighted computations and activation functions.

For example, as discussed in FIG. 3A, the image generation module 330 receives an input 340 of an image (or in the form of latent vector input 102) and transforms the input into an output 350 of a generated image. To perform the transformation, each neuron receives input signals, performs a weighted sum of the inputs according to weights assigned to each connection (e.g., 351, 352), and then applies an activation function (e.g., 361, 362, etc.) associated with the respective neuron to the result. The output of the activation function is passed to the next layer of neurons or serves as the final output of the network. The activation function may be the same or different across different layers. Example activation functions include but not limited to Sigmoid, hyperbolic tangent, Rectified Linear Unit (ReLU), Leaky ReLU, Softmax, and/or the like. In this way, after a number of hidden layers, input data received at the input layer 341 is transformed into rather different values indicative data characteristics corresponding to a task that the neural network structure has been designed to perform.

The output layer 343 is the final layer of the neural network structure. It produces the network's output or prediction based on the computations performed in the preceding layers (e.g., 341, 342). The number of nodes in the output layer depends on the nature of the task being addressed. For example, in a binary classification problem, the output layer may consist of a single node representing the probability of belonging to one class. In a multi-class classification problem, the output layer may have multiple nodes, each representing the probability of belonging to a specific class.

Therefore, the image generation module 330 and/or one or more of its submodules 331-333 may comprise the transformative neural network structure of layers of neurons, and weights and activation functions describing the non-linear transformation at each neuron. Such a neural network structure is often implemented on one or more hardware processors 310, such as a graphics processing unit (GPU). An example of a model which utilizes a neural network may be a DDM model 104 in FIG. 1, and/or the like.

In one embodiment, the image generation module 330 and its submodules 331-333 may be implemented by hardware, software and/or a combination thereof. For example, the image generation module 330 and its submodules 331-333 may comprise a specific neural network structure implemented and run on various hardware platforms 360, such as but not limited to CPUs (central processing units), GPUs (graphics processing units), FPGAs (field-programmable gate arrays), Application-Specific Integrated Circuits (ASICs), dedicated AI accelerators like TPUs (tensor processing units), and specialized hardware accelerators designed specifically for the neural network computations described herein, and/or the like. Example specific hardware for neural network structures may include, but not limited to Google Edge TPU, Deep Learning Accelerator (DLA), NVIDIA AI-focused GPUs, and/or the like. The specific configuration of hardware 360 used to implement the neural network structure depends on factors such as the complexity of the neural network, the scale of the tasks (e.g., training time, input data scale, size of training dataset, etc.), and the desired performance.

In one embodiment, the neural network based image generation module 330 and one or more of its submodules 331-333 may be trained by iteratively updating the underlying parameters (e.g., weights 351, 352, etc., bias parameters and/or coefficients in the activation functions 361, 362 associated with neurons) of the neural network based on the loss described in relation to FIG. 2B. For example, during forward propagation (pass), the training data such as conditioning text 110 are fed into the neural network based DDM 104 through multiple forward steps. The data flows through the network's layers 341, 342, with each layer performing computations based on its weights, biases, and activation functions until the output layer 343 produces the network's output 350.

DDM submodule 331 may include a DDM which is used repeatedly to iteratively denoise an image, where each input to the DDM (e.g, at an input layer 341) provides a slightly less noisy output (e.g., at an output layer 343), and that slightly denoised output is fed back into the input of the DDM (e.g., at input layer 341) for another iterative denoising step. Image generation module 330 may calculate a gradient of a loss computed from the fully denoised image vector (e.g., output 350 after all iterations of the DDM), with respect to the noised image vector (e.g., input 102) by backpropagation of the text-conditioned DDM. The backpropagation may be based on intermediate variables including the first or the second intermediate output of the DDM (e.g., the content of output layer 343 after each iteration of the DDM). The gradient may be computed based on the chain rule, accounting for each iteration of DDM denoising as a function. Calculating the gradient at each DDM iteration during a backward pass may include reconstructing each intermediate input to the DDM based on the output (e.g., utilizing the EDICT method). These gradients quantify the sensitivity of the network's output to changes in the parameters, in this case specifically the sensitivity to the input 102. Using this gradient, input 102 may be modified to minimize the loss which the gradient is based on. This optimization of input 102 may be performed while keeping the parameters of the DDM itself frozen.

Training of the DDM itself may include updating parameters of the neural network backwardly from the last layer to the input layer (backpropagating) based on the computed negative gradient using an optimization algorithm to minimize the loss. The backpropagation from the last layer 343 to the input layer 341 may be conducted for a number of training samples in a number of iterative training epochs. In this way, parameters of the neural network may be gradually updated in a direction to result in a lesser or minimized loss, indicating the neural network has been trained to generate a predicted output value closer to the target output value with improved prediction accuracy. Training may continue until a stopping criterion is met, such as reaching a maximum number of epochs or achieving satisfactory performance on the validation data. At this point, the trained network can be used to make predictions on new, unseen data, such as generating a new image based on an input of prompt and text description.

Therefore, the training process transforms the neural network into an "updated" trained neural network with updated parameters such as weights, activation functions, and biases. The trained neural network thus improves neural network technology in digital image generation.

Figure 4:
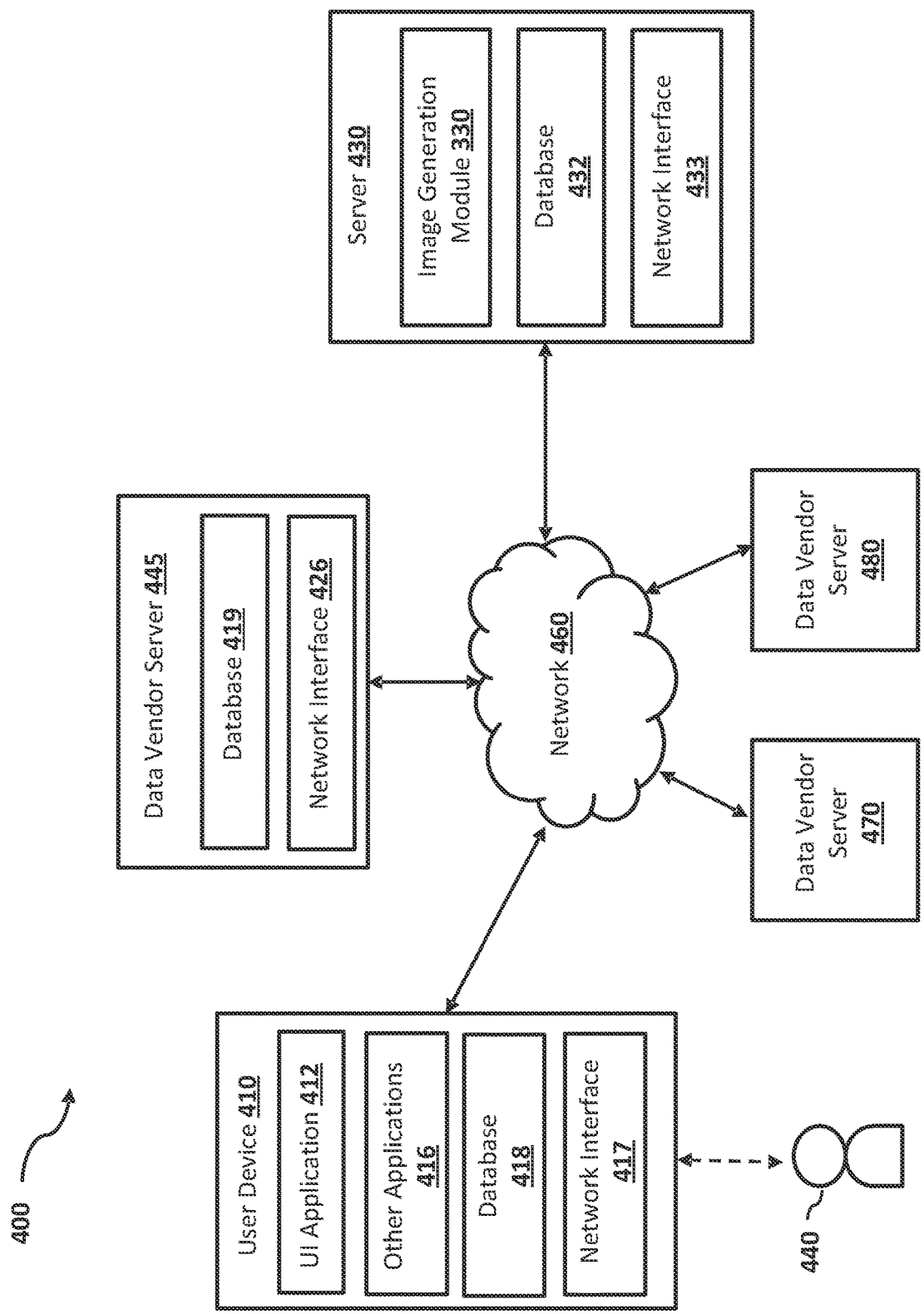
FIG. 4 is a simplified block diagram of a networked system suitable for implementing the image generation framework described in FIGS. 1-3 and other embodiments described herein.

FIG. 4 is a simplified block diagram of a networked system 400 suitable for implementing the image generation framework described in FIGS. 1-3 and other embodiments described herein. In one embodiment, system 400 includes the user device 410 which may be operated by user 440, data vendor servers 445, 470 and 480, server 430, and other forms of devices, servers, and/or software components that operate to perform various methodologies in accordance with the described embodiments. Exemplary devices and servers may include device, stand-alone, and enterprise-class servers which may be similar to the computing device 300 described in FIG. 3A, operating an OS such as a MICROSOFT® OS, a UNIX® OS, a LINUX® OS, or other suitable device and/or server-based OS. It can be appreciated that the devices and/or servers illustrated in FIG. 4 may be deployed in other ways and that the operations performed, and/or the services provided by such devices and/or servers may be combined or separated for a given embodiment and may be performed by a greater number or fewer number of devices and/or servers. One or more devices and/or servers may be operated and/or maintained by the same or different entities.

The user device 410, data vendor servers 445, 470 and 480, and the server 430 may communicate with each other over a network 460. User device 410 may be utilized by a user 440 (e.g., a driver, a system admin, etc.) to access the various features available for user device 410, which may include processes and/or applications associated with the server 430 to receive an output data anomaly report.

User device 410, data vendor server 445, and the server 430 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 460.

User device 410 may be implemented as a communication device that may utilize appropriate hardware and software configured for wired and/or wireless communication with data vendor server 445 and/or the server 430. For example, in one embodiment, user device 410 may be implemented as an autonomous driving vehicle, a personal computer (PC), a smart phone, laptop/tablet computer, wristwatch with appropriate computer hardware resources, eyeglasses with appropriate computer hardware (e.g., GOOGLE GLASS®), other type of wearable computing device, implantable communication devices, and/or other types of computing devices capable of transmitting and/or receiving data, such as an IPAD® from APPLE®. Although only one communication device is shown, a plurality of communication devices may function similarly.

User device 410 of FIG. 4 contains a user interface (UI) application 412, and/or other applications 416, which may correspond to executable processes, procedures, and/or applications with associated hardware. For example, the user device 410 may receive a message with a generated image from the server 430 and display the image via the UI application 412. In other embodiments, user device 410 may include additional or different modules having specialized hardware and/or software as required.

In various embodiments, user device 410 includes other applications 416 as may be desired in particular embodiments to provide features to user device 410. For example, other applications 416 may include security applications for implementing client-side security features, programmatic client applications for interfacing with appropriate application programming interfaces (APIs) over network 460, or other types of applications. Other applications 416 may also include communication applications, such as email, texting, voice, social networking, and IM applications that allow a user to send and receive emails, calls, texts, and other notifications through network 460. For example, the other application 416 may be an email or instant messaging application that receives a prediction result message from the server 430. Other applications 416 may include device interfaces and other display modules that may receive input and/or output information. For example, other applications 416 may contain software programs for asset management, executable by a processor, including a graphical user interface (GUI) configured to provide an interface to the user 440 to view generated images.

User device 410 may further include database 418 stored in a transitory and/or non-transitory memory of user device 410, which may store various applications and data and be utilized during execution of various modules of user device 410. Database 418 may store user profile relating to the user 440, predictions previously viewed or saved by the user 440, historical data received from the server 430, and/or the like. In some embodiments, database 418 may be local to user device 410. However, in other embodiments, database 418 may be external to user device 410 and accessible by user device 410, including cloud storage systems and/or databases that are accessible over network 460.

User device 410 includes at least one network interface component 417 adapted to communicate with data vendor server 445 and/or the server 430. In various embodiments, network interface component 417 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices.

Data vendor server 445 may correspond to a server that hosts database 419 to provide training and/or conditioning datasets including conditioning images, prompts, and/or loss functions to the server 430. The database 419 may be implemented by one or more relational database, distributed databases, cloud databases, and/or the like.

The data vendor server 445 includes at least one network interface component 426 adapted to communicate with user device 410 and/or the server 430. In various embodiments, network interface component 426 may include a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency, infrared, Bluetooth, and near field communication devices. For example, in one implementation, the data vendor server 445 may send asset information from the database 419, via the network interface 426, to the server 430.

The server 430 may be housed with the image generation module 330 and its submodules described in FIGS. 3A-3B. In some implementations, image generation module 330 may receive data from database 419 at the data vendor server 445 via the network 460 to generate images. The generated images may also be sent to the user device 410 for review by the user 440 via the network 460.

The database 432 may be stored in a transitory and/or non-transitory memory of the server 430. In one implementation, the database 432 may store data obtained from the data vendor server 445. In one implementation, the database 432 may store parameters of the image generation module 330. In one implementation, the database 432 may store previously generated images, and the corresponding input feature vectors.

In some embodiments, database 432 may be local to the server 430. However, in other embodiments, database 432 may be external to the server 430 and accessible by the server 430, including cloud storage systems and/or databases that are accessible over network 460.

The server 430 includes at least one network interface component 433 adapted to communicate with user device 410 and/or data vendor servers 445, 470 or 480 over network 460. In various embodiments, network interface component 433 may comprise a DSL (e.g., Digital Subscriber Line) modem, a PSTN (Public Switched Telephone Network) modem, an Ethernet device, a broadband device, a satellite device and/or various other types of wired and/or wireless network communication devices including microwave, radio frequency (RF), and infrared (IR) communication devices.

Network 460 may be implemented as a single network or a combination of multiple networks. For example, in various embodiments, network 460 may include the Internet or one or more intranets, landline networks, wireless networks, and/or other appropriate types of networks. Thus, network 460 may correspond to small scale communication networks, such as a private or local area network, or a larger scale network, such as a wide area network or the Internet, accessible by the various components of system 400.

Example Work Flows

Figure 5:
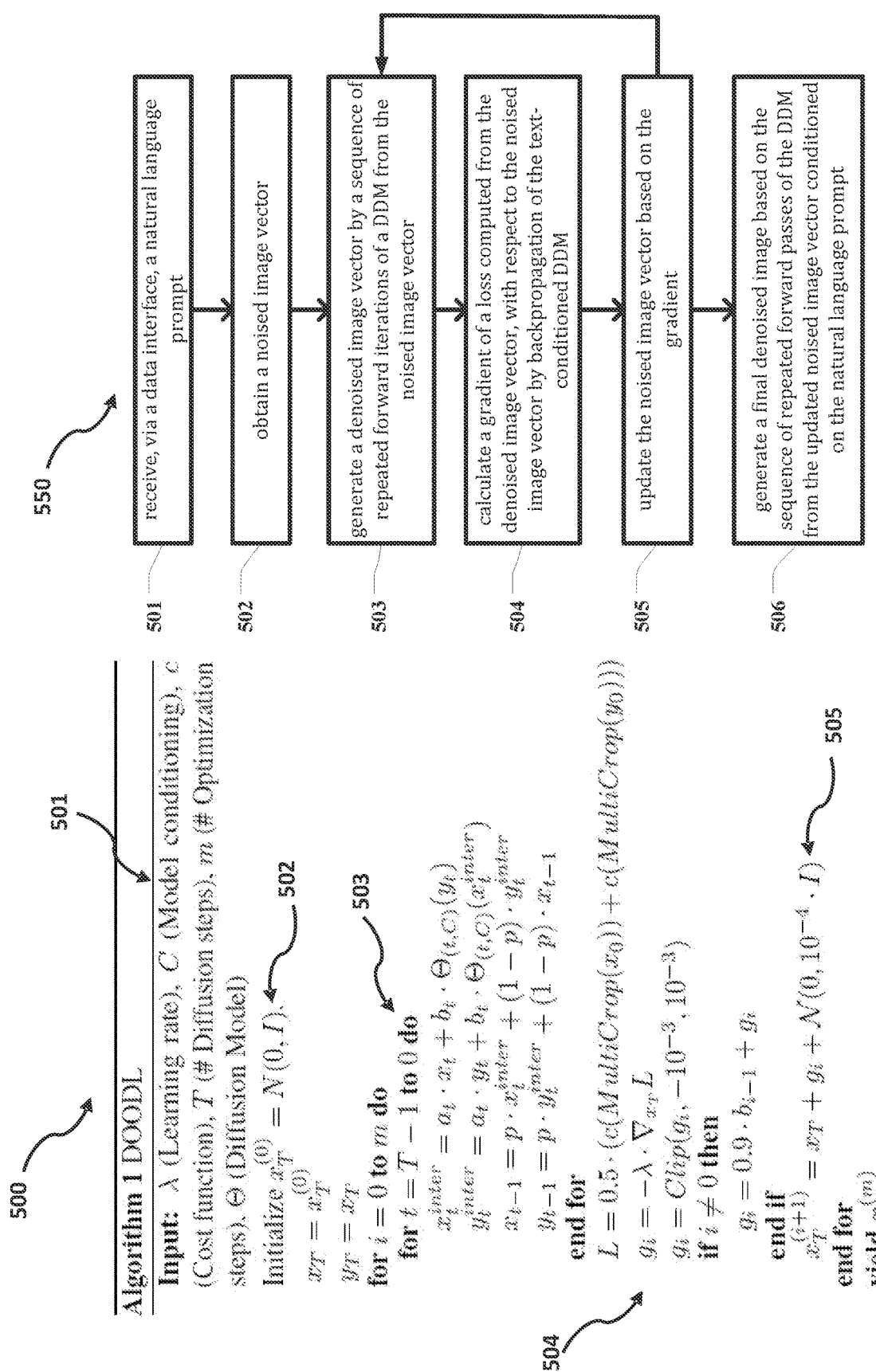
FIG. 5A provides an example pseudo-code segment illustrating an example algorithm for a method of optimization based on the framework shown in FIGS. 1-4.
FIG. 5B provides an example logic flow diagram illustrating a method of a image generation according to some embodiments.

FIG. 5A provides an example pseudo-code segment illustrating an example algorithm 500 for a method of optimization based on the framework shown in FIGS. 1-4. FIG. 5B provides an example logic flow diagram illustrating a method of a image generation based on the algorithm 500 in FIG. 5A, although not limited to features described in algorithm 500, according to some embodiments described herein. One or more of the processes of method 550 may be implemented, at least in part, in the form of executable code stored on non-transitory, tangible, machine-readable media that when run by one or more processors may cause the one or more processors to perform one or more of the processes. In some embodiments, method 550 corresponds to an example operation of the image generation module 330 (e.g., FIG. 3A).

As illustrated, the method 550 includes a number of enumerated steps, but aspects of the method 550 may include additional steps before, after, and in between the enumerated steps. In some aspects, one or more of the enumerated steps may be omitted or performed in a different order.

At step 501, a system receives, via a data interface (e.g., data interface 315 in FIG. 3A), a natural language prompt (e.g., conditioning text 110). This step may be omitted when, as discussed above, the only guidance desired is from the selected loss function/model used for latent optimization. As illustrated in algorithm 500, the system may also receive other parameters such as a learning rate $\lambda$, an indication of a cost function (e.g., a loss associated with a classifier/scorer or otherwise), the number of diffusion steps T (e.g., 50), number of optimization steps m (e.g., 50), and a diffusion model $\Theta$ (e.g., DDM 104 in FIG. 1). These parameters may be indicated by a user via a user-interface. In some embodiments, parameters are indicated directly (e.g., number of optimization steps), or may be indicated indirectly (e.g., selecting a DDM to use whose parameters are stored elsewhere on the system/network).

At step 502, the system obtains a noised image vector (e.g., latent vector input 102 in FIG. 1) for generating an image corresponding to the natural language prompt. In some embodiments, the noised image vector is initialized using a standard normal distribution. In other embodiments, the noised image vector is computed based on noising a provided image using a reversible diffusion process such as EDICT. The noised image vector may represent the pixels of an image, or may represent an abstract latent representation of an image. The noised image vector may be retrieved from memory as previously obtained and stored, for example when it is desired to repeat the method using the same starting vector.

At step 503, the system may generate, by the text-conditioned DDM based on a neural network implemented on one or more hardware processors, a denoised image vector. The system may generate the denoised image vector by a sequence of repeated forward iterations of the text-conditioned DDM from the noised image vector, wherein a first intermediate output of the text-conditioned DDM is fed to the text-conditioned DDM as an intermediate input to generate a second intermediate output conditioned on the natural language prompt during a first forward iteration. As discussed above, the natural language prompt may be omitted when only the guidance of the latent optimization is desired, such as when starting with a noised image. During the forward iterations, the intermediate latents (i.e., activations) do not need to be stored in memory, as they may be easily recomputed during the backward pass.

At step 504, the system may calculate a gradient of a loss computed from the denoised image vector, with respect to the noised image vector by backpropagation of the text-conditioned DDM. The backpropagation may be based on intermediate variables including the first or the second intermediate output computed during a first backward iteration that mirrors the first forward iteration in a reversible diffusion process. The loss function may be any differentiable loss function, including those calculated based on a neural-network model such as a fine-grained visual classifier, aesthetic scorer, or other model as discussed with respect to FIGS. 2A-2B. The gradient may be computed based on the chain rule, accounting for each iteration of DDM denoising as a function. Calculating the gradient at each DDM iteration during a backward pass may include reconstructing the input to the DDM based on the output (e.g., utilizing the EDICT method).

At step 505, the system may update the noised image vector based on the gradient. The step may be in the opposite direction of the computed gradient, scaled by the learning rate parameter. In some embodiments, the step adjustment to the noised image vector may include momentum such that the step is based on the currently computed gradient and previously computed gradients as illustrated in algorithm 500. In some embodiments, noise may be included in the update in order to avoid local minima.

As illustrated, steps 503-505 may be performed iteratively, re-generating a denoised image, calculating a gradient, and updating the noised image vector a number of times to successively optimize the noised image vector (latent). Steps 503-505 may be performed a predetermined number of times (e.g., 50) as configured, or as selected by a user via a user interface.

At step 506, the system may generate a final denoised image based on a second forward pass of a plurality of iterations of the denoising diffusion model with the updated noised image vector as an input and conditioned on the natural language prompt. In some embodiments, an additional neural-network model may be used to generate an image representation which may be readily displayed based on a latent representation generated by the DDM. The generated image may be transmitted over a network and/or displayed on a display.

Example Results

Figure 6:
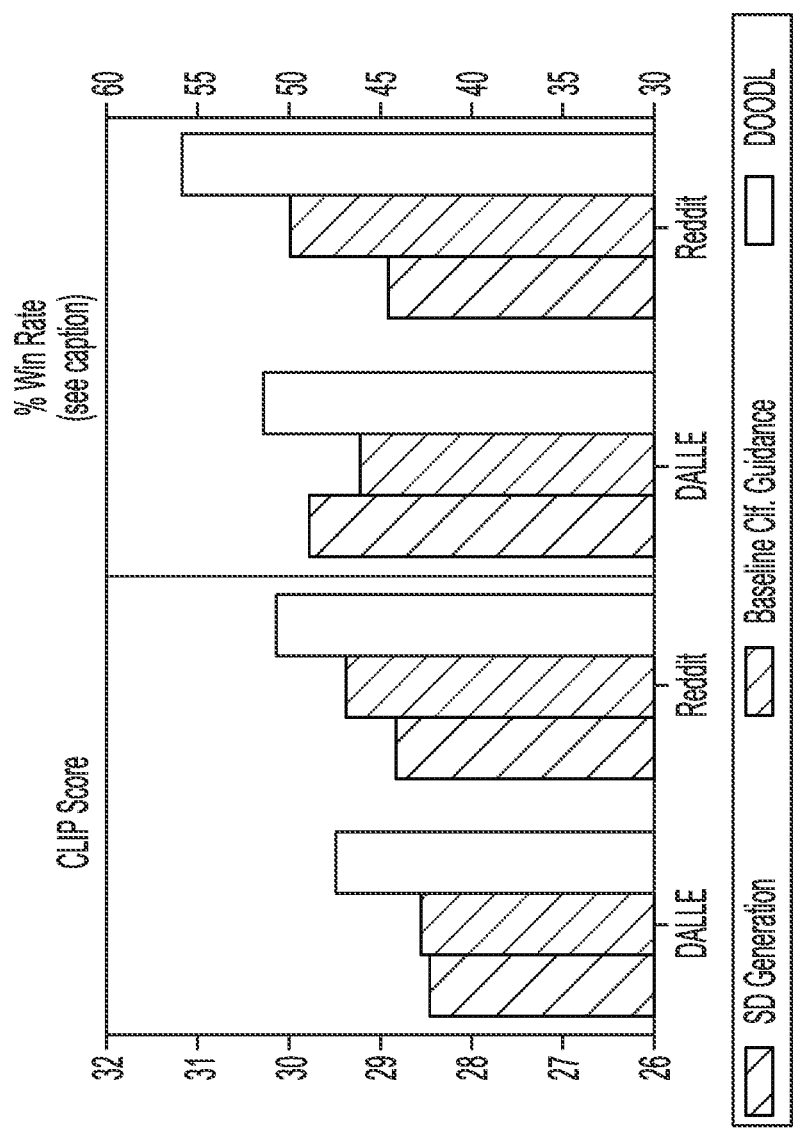
FIGS. 6-7 provide charts illustrating exemplary performance of different embodiments described herein.
Figure 7:
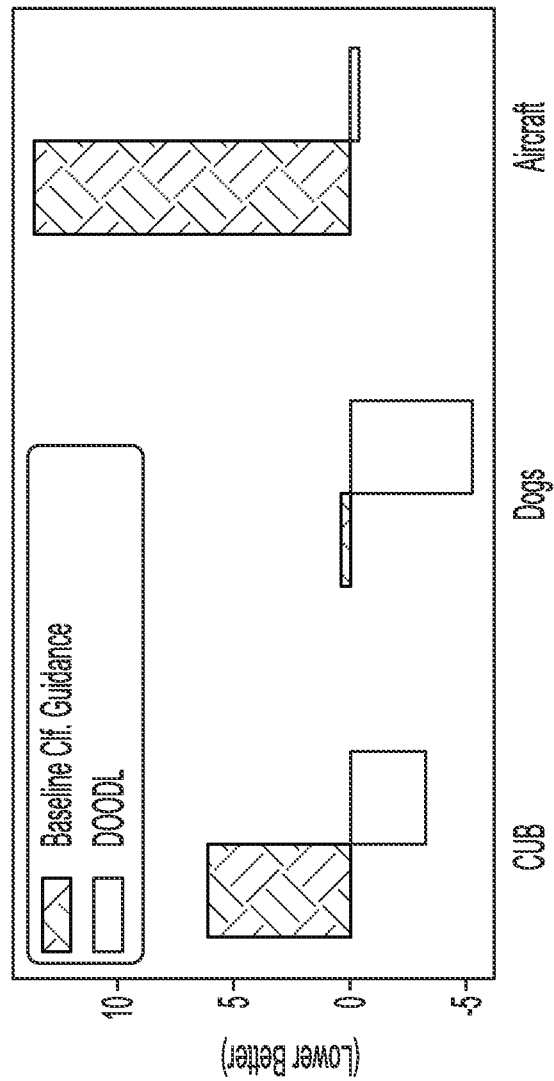

FIGS. 6-7 represent exemplary test results using embodiments described herein. Benchmarks used for the test results include the DrawBench benchmark as described in Saharia et al., Photorealistic text-to-image diffusion models with deep language understanding. In particular, DOODL was evaluated on the DALLE and Reddit categories of the DrawBench benchmark.

FIG. 6 illustrates a quantitative evaluation of DOODL performed by measuring the image-text alignment with CLIP score and using a human evaluation study. SD generation is a baseline Stable Diffusion image generation based on a text input. Baseline classifier (clf.) guidance is a LAION-trained CLIP model for classifier guidance as described in Vogel et al., VL-Taboo: An Analysis of Attribute-based Zero-shot Capabilities of Vision-Language Models, arXiv:2209.06103, 2022. The left side of FIG. 6 illustrates DrawBench CLIP scores, and the right side shows human evaluation. In a human evaluation, 5 labelers were given a pairwise comparison of DOODL to another method for the same prompt-seed inputs and asked which represents the prompt better, with options for equal success or failure. What is illustrated is the fraction of time for each method that it was classified by the majority of labelers as "better" or "both achieve".

FIG. 7 illustrates quantitative results for rare vocabulary generation using DOODL and vanilla classifier guidance. For image generation using classifier guidance and DOODL, the experiment was performed using FGVC classifiers from WS-DAN as described in Hu et al., See better before looking closer: Weakly supervised data augmentation network for fine-grained visual classification, arXiv: 1901.09891, 2019. To evaluate performance, we measure the FID between a set of generated images with each method and the validation set of the FGVC dataset being studied, where FID is the Fréchet Inception Distance as described in Heusel et al., Gans trained by a two time-scale update rule converge to a local nash equilibrium, Advances in neural information processing systems, 30, 2017. Results in FIG. 7 show that DOODL reduces FID as compared to original Stable Diffusion on all datasets, while classifier guidance increases it. This indicates that DOODL is able to better incorporate the gradient signal from classifier as compared to a one-step approximation.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure. Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and, in a manner, consistent with the scope of the embodiments disclosed herein.

What is claimed is:

1. A method of image generation by a conditioned denoising diffusion model (DDM), the method comprising:
    receiving, via a data interface, a natural language prompt;
    obtaining a noised image vector for generating an image corresponding to the natural language prompt;
        generating, by the conditioned DDM based on a neural network implemented on one or more hardware processors, a denoised image vector by a sequence of repeated forward iterations of the conditioned DDM from the noised image vector,
    wherein a first intermediate output of the conditioned DDM is fed to the conditioned DDM as an intermediate input to generate a second intermediate output conditioned on the natural language prompt during a first forward iteration;

calculating a gradient of a loss computed from the denoised image vector, with respect to the noised image vector by backpropagation of the conditioned DDM, wherein the backpropagation is based on intermediate variables including the first or the second intermediate output computed during a first backward iteration that mirrors the first forward iteration in a reversible diffusion process;

updating the noised image vector based on the gradient; and generating a final denoised image based on the sequence of repeated forward passes of the conditioned DDM from the updated noised image vector conditioned on the natural language prompt.

2. The method of claim 1, wherein the calculating a gradient comprises reconstructing the intermediate variables of each iteration of the conditioned DDM based on the respective outputs of the iterations of the conditioned DDM.

3. The method of claim 1, further comprising:

storing a first output of a forward iteration of the sequence of repeated forward iterations of the conditioned DDM; and overwriting the first output with a second output of a subsequent forward iteration of the conditioned DDM.

4. The method of claim 1, wherein loss is based on a neural-network based model.

5. The method of claim 4, wherein the neural-network based model is at least one of:
a visual encoder;
a text encoder;
a visual classifier; or
an aesthetic scorer.

6. The method of claim 1, wherein the obtaining the noised image vector comprises initializing the noised image vector with a standard normal distribution.

7. The method of claim 1, wherein the obtaining the noised image vector comprises computing the noised image vector based on noising an input image via a reversed diffusion process using the conditioned DDM.

8. A system for generating an image, the system comprising:

a memory that stores a conditioned denoising diffusion model (DDM) and a plurality of processor executable instructions;

a communication interface that receives a natural language prompt; and one or more hardware processors that read and execute the plurality of processor-executable instructions from the memory to perform operations comprising:

obtaining a noised image vector for generating an image corresponding to the natural language prompt;

generating, by the conditioned DDM based on a neural network implemented on one or more hardware processors, a denoised image vector by a sequence of repeated forward iterations of the conditioned DDM from the noised image vector, wherein a first intermediate output of the conditioned DDM is fed to the conditioned DDM as an intermediate input to generate a second intermediate output conditioned on the natural language prompt during a first forward iteration;

calculating a gradient of a loss computed from the denoised image vector, with respect to the noised image vector by backpropagation of the conditioned DDM, wherein the backpropagation is based on intermediate variables including the first or the second intermediate output computed during a first backward iteration that mirrors the first forward iteration in a reversible diffusion process;

updating the noised image vector based on the gradient; and generating a final denoised image based on the sequence of repeated forward passes of the conditioned DDM from the updated noised image vector conditioned on the natural language prompt.

9. The system of claim 8, wherein the calculating a gradient comprises reconstructing the intermediate variables of each iteration of the conditioned DDM based on the respective outputs of the iterations of the conditioned DDM.

10. The system of claim 8, the operations further comprising:

storing a first output of a forward iteration of the sequence of repeated forward iterations of the conditioned DDM; and overwriting the first output with a second output of a subsequent forward iteration of the conditioned DDM.

11. The system of claim 8, wherein loss is based on a neural-network based model.

12. The system of claim 11, wherein the neural-network based model is at least one of:
a visual encoder;
a text encoder;
a visual classifier; or
an aesthetic scorer.

13. The system of claim 8, wherein the obtaining the noised image vector comprises initializing the noised image vector with a standard normal distribution.

14. The system of claim 8, wherein the obtaining the noised image vector comprises computing the noised image vector based on noising an input image via a reversed diffusion process using the conditioned DDM.

15. A non-transitory machine-readable medium comprising a plurality of machine-executable instructions which, when executed by one or more processors, are adapted to cause the one or more processors to perform operations comprising:

receiving, via a data interface, a natural language prompt;

obtaining a noised image vector for generating an image corresponding to the natural language prompt;

generating, by a conditioned denoising diffusion model (DDM) based on a neural network implemented on one or more hardware processors, a denoised image vector by a sequence of repeated forward iterations of the conditioned DDM from the noised image vector, wherein a first intermediate output of the conditioned DDM is fed to the conditioned DDM as an intermediate input to generate a second intermediate output conditioned on the natural language prompt during a first forward iteration;

calculating a gradient of a loss computed from the denoised image vector, with respect to the noised image vector by backpropagation of the conditioned DDM, wherein the backpropagation is based on intermediate variables including the first or the second intermediate output computed during a first backward iteration that mirrors the first forward iteration in a reversible diffusion process;

updating the noised image vector based on the gradient; and generating a final denoised image based on the sequence of repeated forward passes of the conditioned DDM from the updated noised image vector conditioned on the natural language prompt.

16. The non-transitory machine-readable medium of claim 15, wherein the calculating a gradient comprises reconstructing the intermediate variables of each iteration of the conditioned DDM based on the respective outputs of the iterations of the conditioned DDM.

17. The non-transitory machine-readable medium of claim 15, the operations further comprising:
storing a first output of a forward iteration of the sequence of repeated forward iterations of the conditioned DDM; and
overwriting the first output with a second output of a subsequent forward iteration of the conditioned DDM.

18. The non-transitory machine-readable medium of claim 15, wherein loss is based on a neural-network based model.

19. The non-transitory machine-readable medium of claim 18, wherein the neural-network based model is at least one of:
a visual encoder;
a text encoder;
a visual classifier; or
an aesthetic scorer.

20. The non-transitory machine-readable medium of claim 15, wherein the obtaining the noised image vector comprises initializing the noised image vector with a standard normal distribution.

* * * * *